United States Patent [19]

Nagai et al.

[11] 4,425,798
[45] Jan. 17, 1984

[54] APPARATUS FOR DIAGNOSING ABNORMALITIES IN ROTATING MACHINES

[75] Inventors: Isao Nagai, Kobe; Kenzo Wada, Ashiya, both of Japan

[73] Assignee: Kawasaki Steel Corporation, Kobe, Japan

[21] Appl. No.: 321,172

[22] PCT Filed: Mar. 13, 1981

[86] PCT No.: PCT/JP81/00055
§ 371 Date: Nov. 12, 1981
§ 102(e) Date: Nov. 12, 1981

[87] PCT Pub. No.: WO81/02785
PCT Pub. Date: Oct. 1, 1981

[30] Foreign Application Priority Data

Mar. 26, 1980 [JP] Japan .................................. 55-39521
Apr. 2, 1980 [JP] Japan .................................. 55-43974

[51] Int. Cl.³ .................... G01M 1/22; G01M 13/00; G01N 29/00
[52] U.S. Cl. ............................. 73/659; 73/660
[58] Field of Search ................ 73/659, 660; 364/576; 324/77 B

[56] References Cited

U.S. PATENT DOCUMENTS 4,184,205  1/1980  Morrow ............................... 73/659
4,312,232  1/1982  Stoutenburg ......................... 73/659
4,352,293 10/1982  Kurihara et al. ..................... 73/660

Primary Examiner—Howard A. Birmiel
Attorney, Agent, or Firm—Jackson, Jones & Price

[57] ABSTRACT

A portalbe apparatus is disclosed for the diagnosis of a rotating machinery utilizing a fast Fourier transform frequency spectrum analysis system. The presence or absence of an abnormality or trouble in the rotating machinery is determined by selecting high amplitudes out from the frequency spectrum computed by the FFT frequency spectrum analysis system, arithmetically processing distribution data of spectrum amplitudes adjacent each frequency giving the corresponding high amplitude, and detecting the amplitude, at which the frequency of vibrations of the rotating machinery has attained a maximum value, together with such frequency. The diagnosis of the rotating machinery with this apparatus can be performed in situ, i.e., at the site of installation of such machinery.

10 Claims, 8 Drawing Figures

Fig. 1  Abnormalities and Frequency of Vibration

| Location of Abnormalities | Abnormalities | Frequency of Vibration | Direction of Vibration |
|---|---|---|---|
| Rotor | Defective balance | fo | Radial |
| Shaft | Bending | fo  2fo  3fo | " |
| " | Flattening | 2fo | " |
| Coupling | Offset | fo  2fo  3fo | Axial |
| " | Defective coupling | Mainly fo (Peculiar phenomena found in gear couplings and fluid couplings) | Radial |
| Ball bearing | Flaw in Inner Race (fi) | $\frac{z}{2}(1+\frac{d}{D}\cos\alpha)$ fo | Radial |
| " | Flaw in Outer Race (fo) | $\frac{z}{2}(1-\frac{d}{D}\cos\alpha)$ fo | " |
| " | Flaw in Ball (fb) | $\frac{D}{d}\{1-(\frac{d}{D})^2\cos^2\alpha\}$ fo | " |
| Thrust bearing | Excessive metal gap | fo | " |
| " | Defective Lubrication | fo | " |
| " | Oil wipping | Less than $\frac{1}{2}$ fo (42-48%) | " |
| Foundation | Defective levelling | fo | Axial |
| " | Insufficient Rigidity | fo | Radial |
| Gear | Defective tooth face | z' fo | " |
| Miscellaneouses | Play resulting from contact between Rotary and Stationary elements | Relatively high | " |
| " | Rattling in system (Loose coupling, Loose impeller, etc.) | $\frac{1}{n}$ fo | " | fo: Frequency of vibration of rotating rotary machinery z: Number of bearing balls d: Diameter of bearing balls D: Diameter of pitch circle of bearing balls α: Angle of contact of bearing balls n: Integer z': Number of defective teeth

| DATA | | DATA | |
| --- | --- | --- | --- |
| FREQ. HZ | POWER SPECTRUM | FREQ. HZ | POWER SPECTRUM |
| 1 0049 | 0.0975 | 1 0050 | 0.0945 |
| 2 0050 | 0.0810 | 2 0051 | 0.0825 |
| 3 0048 | 0.0300 | 3 0049 | 0.0270 |
| 4 0051 | 0.0255 | 4 0052 | 0.0255 |
| 5 0047 | 0.0165 | 5 0053 | 0.0150 |

```
FREQ. HZ    25   50   75  100      FREQ. HZ    25   50   75  100
          ----+----+----+----                ----+----+----+----
0045      I                         0045
0046      I                         0046      I
0047      I I                       0047      I
0048      I I I I                   0048      I
0049      I I I I I I I I I I I I   0049      I I I
0050      I I I I I I I I I         0050      I I I I I I I I I I I I
0051      I I I                     0051      I I I I I I I I I I I
0052      I                         0052      I I I
0053      I                         0053      I I
0054                                0054      I
```

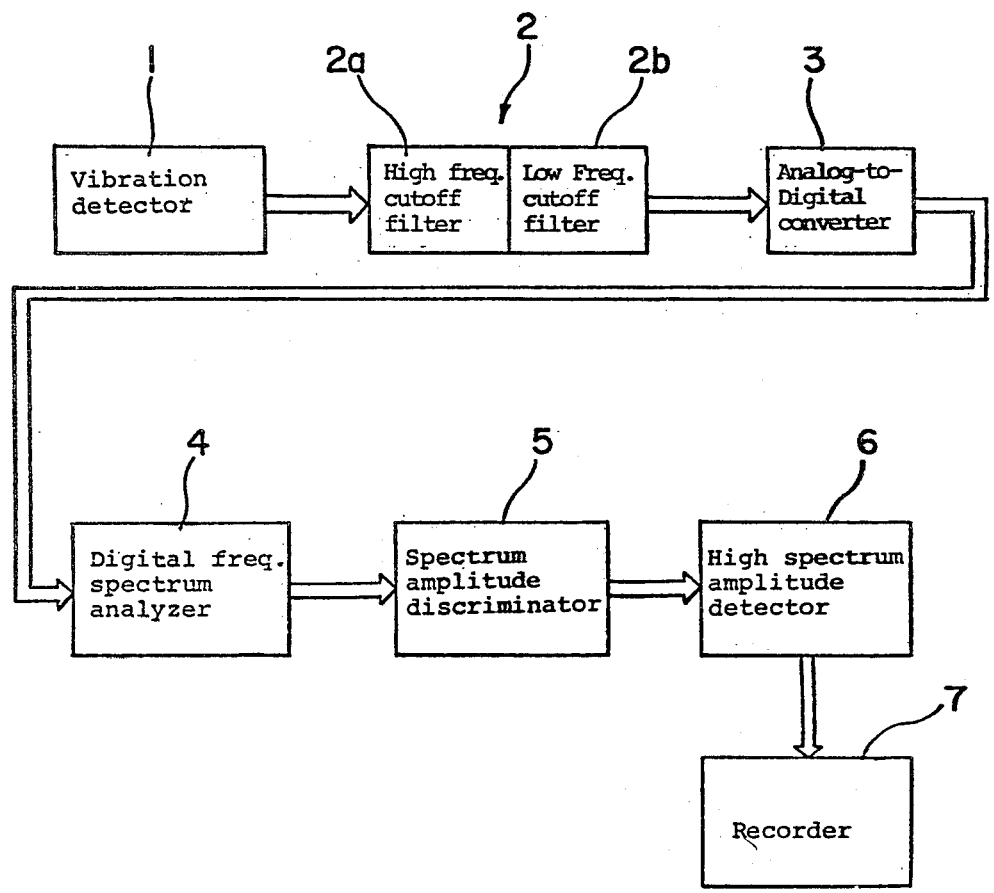

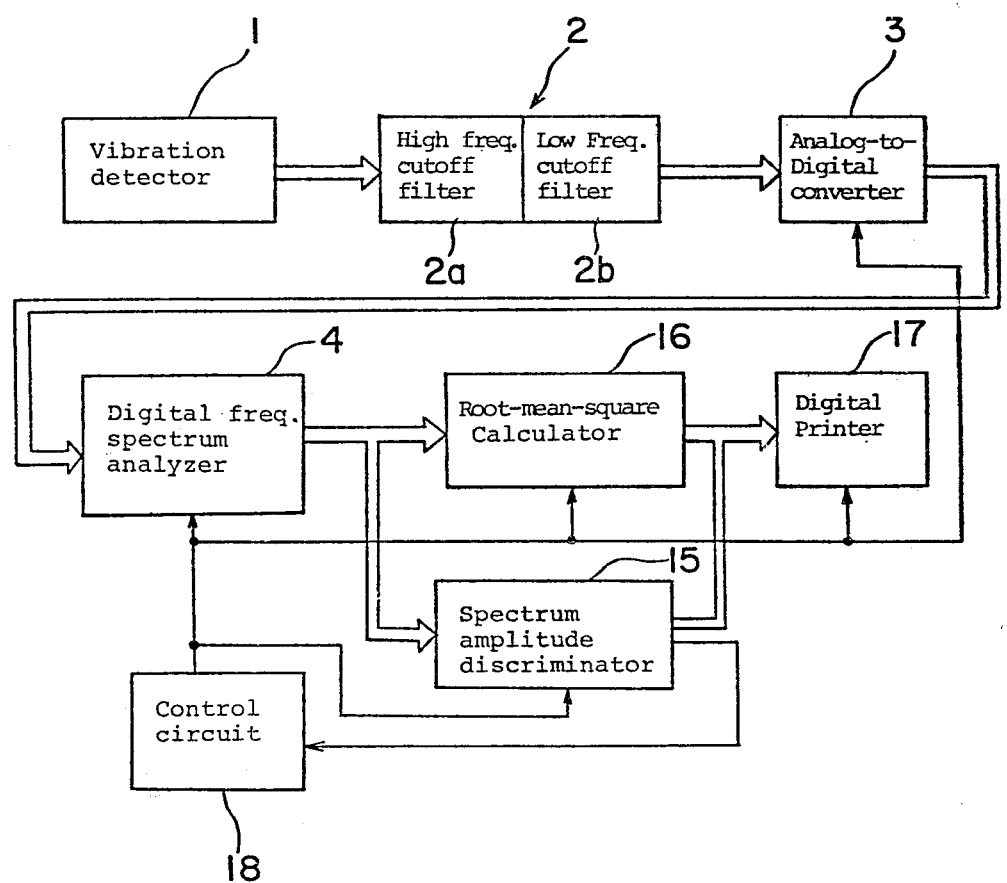

| Input frequency | Root-mean-square output |
|---|---|
| 2.5 | 0.983 |
| 5.5 | 0.994 |
| 10.5 | 0.985 |
| 20.5 | 0.981 |
| 500.5 | 0.981 |
| 5.1 | 0.991 |
| 5.2 | 0.990 |
| 5.3 | 0.996 |
| 5.4 | 0.999 |
| 500.1 | 0.998 |
| 500.2 | 0.993 |
| 500.3 | 0.986 |
| 500.4 | 0.981 |

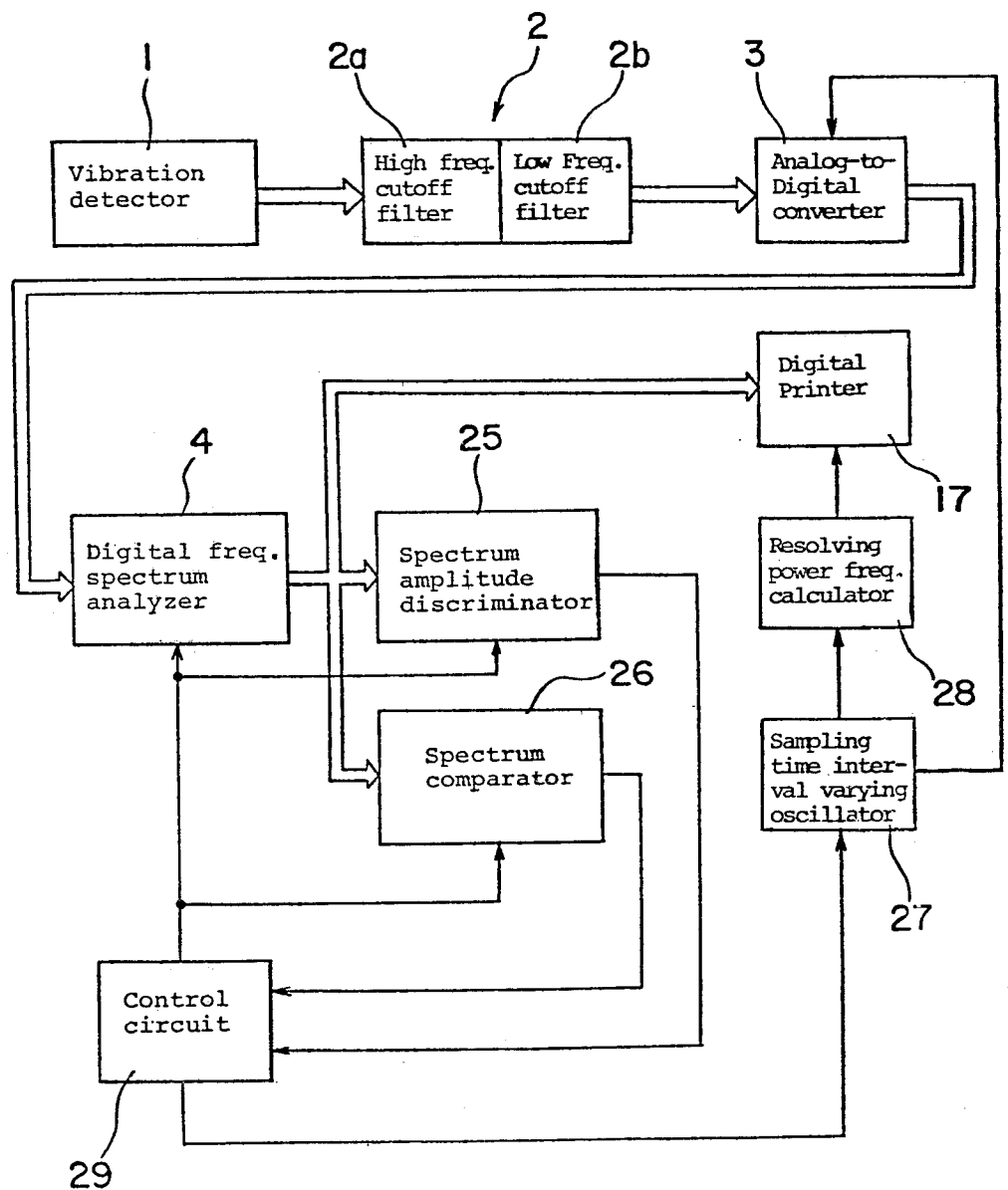

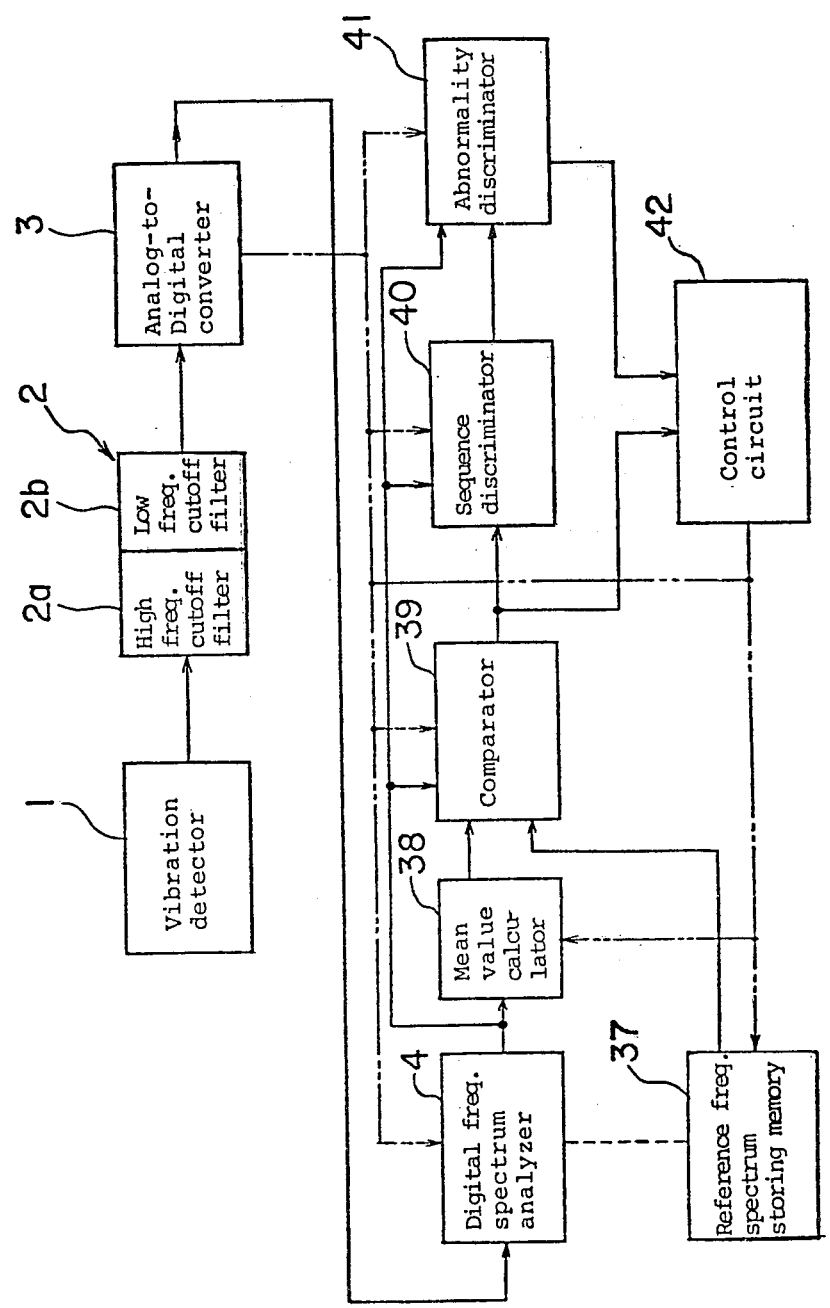

APPARATUS FOR DIAGNOSING ABNORMALITIES IN ROTATING MACHINES

TECHNICAL FIELD

The present invention generally relates to an apparatus for diagnosing abnormalities occurring in a source of rotary drive and/or a transmission system for the rotary drive and, more particularly, to a portable apparatus which can be brought to the site of installation of a rotating machine for diagnosing an abnormality occurring in the rotating machine by analyzing a spectrum of vibrations generated in the rotating machine.

BACKGROUND ART

In order to maintain machines and equipments at their optimum performance, the precautionary servicing and maintenance engineering has gained its importance and is currently effectively introduced in the factory workshop.

It has long been well known that, while most of the machines and equipments employed in various fields of industries utilize a rotating and a reciprocating machine, the presence of an abnormality in any one of the rotating and reciprocating machines can be determined when it is found that the overall amplitude of vibration detected from the machine becomes abnormally higher than the amplitude of vibration during a normal operating condition of the machine. In other words, the presence and absence of an abnormality in the machine can be determined by the magnitude of the overall amplitude of vibrations generated by such machine.

So far as the rotating machine is concerned, it is also well known, as it is actually performed, that the location of a trouble and a cause therefor can be specifically determined by detecting and analyzing the frequency spectra of vibrations and then by calculating the individual amplitudes of the frequency spectra.

According to the prior art, the trouble-shooting of the rotating machine is carried out by bringing a vibration recorder to the site of installation of the machine to be examined, recording data of vibrations of the machine on a magnetic recording tape, and analyzing the recorded vibration data by the use of a large-sized spectrum analyzer at a research laboratory or a similar establishment remote from the site of installation of the machine. This technique is far from the real-time analysis and is, therefore, inconvenient and timeconsuming.

In view of the above, there has been proposed a diagnosing apparatus incorporating therein a frequency spectrum analyzer utilizing a digital-type fast Fourier transform (FFT). With this diagnosing apparatus, the real-time determination of the presence and absence of an abnormality in the rotating machine can be performed in situ.

Specifically, this diagnosing apparatus weighs 10 to 30 Kg and for use is, brought to the site of installation of the rotating machine for the real time frequency analysis carried out in such a manner that, when a significant amplitude spectrum appears in a particular frequency component of the fundamental frequency which is a function of the number of revolution of the rotating machine being then examined, the particular frequency component containing the significant amplitude spectrum is checked against the frequencies of vibrations which have been generated by such machine and which have previously been theoretically classified according to the location of a trouble and the cause therefor, thereby to find the location of a trouble and the cause therefor.

As is well known to those skilled in the art, the frequency of vibrations generated by a rotating machine during occurrence of an abnormality, the location of the abnormality in such machine and the cause of such abnormality can be theoretically determined and have such a correlation as tabulated in FIG. 1 of the accompanying drawings.

Although the abnormality diagnosing apparatus incorporating the frequency spectrum analyzer using the fast Fourier transform (FFT) has the advantage that the determination of the presence and absence of the abnormality can be performed in situ on the real-time basis, it has the disadvantage that calculation of the distribution of frequency spectra according to the FFT system gives a limited resolving power because of the calculation being performed on a digital system. That is to say, this resolving power is determined by the number of bits of a register used for data calculation so far as the amplitude of the calculated frequency spectrum is involved. By way of example, if the number of bits of the register is eight, the resolving power will be limited to 1/256 of the full-scale input whereas, if it is ten, it will be 1/1024 of the full-scale input.

Still further when the frequency spectra is calculated by means of the FFT system, the frequency resolving power takes a limited value. As is well known, the frequency resolving power is determined by the FFT system according to the sampling time (time interval required to complete analog-to-digital conversion) and the number of input data.

By way of example, assuming that the sampling time interval is expressed by $\Delta t$, and the number N of the input data is expressed by $2^m$, the maximum value $f_M$ of the frequency analyzed is $\frac{1}{2}\Delta t$, and the resolving power $\Delta f$ of the frequency analyzed is expressed by the following equation.

$$\Delta f = 2f_M/N = 2f_M/2^m$$

In other words, the frequency spectra are analyzed to give results at intervals of $\Delta f$ up until the maximum frequency $f_M$ is analyzed. Therefore, the number of the frequency spectra is N/2.

Where an input representative of the frequency of vibrations detected is a function of time relative to a frequency $f_m$ other than the frequency expressed by $n\Delta f$ (wherein n is an integer, 0, 1, 2 ... N/2-1), that is, where $f(t) = A \sin 2\pi f_m t$, the result of spectrum analysis subjected to this input by means of the FFT system does not show a linear spectrum of a single frequency, but a mixture of various frequency spectra.

By way of example, assuming that the number of the input data is 1024 points and the sampling time interval is $9.765 \times 10^{-4}$, the maximum value of the analyzed frequency is expressed as follows.

$$f_M = \tfrac{1}{2}\Delta t = 512 \text{ Hz}$$

$$\Delta t = 2f_M/N = 1 \text{ Hz}$$

and, accordingly, the analyzed frequency range of 1 Hz to 512 Hz can be displayed at intervals of 1 Hz.

Where the input representative of the frequency of vibrations detected has the relationship, $f(t) = A \sin 2\pi f_m t$, the spectrum will be a linear spectrum if $f_m$ is 50.0H, but it will not be a linear spectrum if $f_m$ is 49.7 Hz, 49.8 Hz, 49.9 Hz, 50.1 Hz, 50.2 Hz . . . or 50.6 Hz.

By way of example, if $f_m=49.5$ Hz, the frequency spectrum of the rotating machinery is, as shown in FIG. 2 of the accompanying drawing, distributed on both sides of 50 Hz and 51 Hz and is displayed as if spectrum analysis were subjected to an input representative of combined harmonic vibrations, not of a single harmonic vibration.

This means that, when a vibration of a cycle other than an integer multiple of the resolving power of the analyzed frequency is generated, an accurate spectrum analysis can not be achieved.

Because of the reason discussed above, even when the diagnosing apparatus operating on the basis of the spectrum analysis is used in situ for the real-time diagnosis of the abnormality in the rotating machinery, the absolute value of the vibration amplitude can not be accurately measured where the frequency of vibrations produced is not an integer multiple of the unit of frequency representative of the resolving power. Accordingly, not only is the determination of the location of a trouble and the cause therefore not performed accurately, but also a difficulty is involved in the performance of a precautionary measure at the site of installation of the rotating machinery on a real-time basis by way of checking currently available diagnosis data against the previously obtained diagnosis data.

DISCLOSURE OF THE INVENTION

The present invention has been developed with a view to substantially eliminating the above described disadvantages and inconveniences inherent in the prior art portable diagnosing apparatus for the rotating machinery which utilizes the FFT system, and has for its essential object to provide an improved portable diagnosing apparatus of a similar kind which is effective to indicate an accurate spectrum amplitude even though it receives an input representative of vibrations of a frequency other than an integer multiple of the analyzed frequency.

In order to achieve the above described objective of the present invention, the diagnosing apparatus according to the present invention is featured in that it comprises a vibration detector for detecting vibrations generated by the rotating machinery and generating an electrical vibration signal indicative of the vibrations detected thereby; a bandpass filter unit capable of adjusting its passband in correspondence to the standard vibration of the rotating machinery; an analog-to-digital converter for converting the analog signal which has passed through the filter unit, into a digital signal; a digital frequency spectrum analyzer for calculating a frequency spectrum distribution on the basis of the digital signal supplied thereto; a spectrum amplitude discriminator for selecting high amplitude values out from the frequency spectrum so calculated by the frequency spectrum analyzer; a high spectrum amplitude detector operable for arithmetically processing data of the spectrum amplitude distribution approximating the frequency of the vibrations having the high amplitude values so selected by the spectrum amplitude discriminator to find the maximum possible amplitude of the vibration signal and also the frequency at which the maximum possible amplitude has been attained; and a recorder for recording an output from the high spectrum amplitude detector.

That is to say, in the present invention, a comparison is made in the spectrum amplitude discriminator to determine the high amplitude values from the frequency spectrum calculated by the frequency spectrum analyzer, and both the most probable spectrum amplitude and the frequency of the vibrations having such most probable spectrum amplitude are subsequently detected by the high spectrum amplitude detector from the distribution of high amplitude values even when no linear spectrum is given.

Accordingly, with the diagnosing apparatus embodying the present invention, even when the result of the spectrum analysis did not give a linear spectrum, the result of calculation can give a linear spectrum which ought to be given. Therefore, the determination of the location of a trouble and the cause therefore can accurately be performed with the apparatus of the present invention.

The high spectrum amplitude detector is basically operable to perform a statistical process subject to the selected high amplitude values.

The statistic process referred to above may be performed in a number of ways.

According to a first preferred embodiment of the present invention, the high spectrum amplitude detector comprises a root means square (RMS) circuit so designed that, after the spectrum analysis of the vibrations of the rotating machinery has been performed by the FFT system, the frequency spectrum amplitude so obtained as a result of the spectrum analysis has subsequently been discriminated, and a plurality of, for example, ten, high amplitude values including the maximum value of the frequency spectrum amplitude have then been selected, the RMS value is computed with a plurality of, for example, ten, amplitude values in the vicinity of each of the selected ten amplitude values.

Accordingly, in the first preferred embodiment of the present invention, even though the spectrum analysis based on the FFT system does not result in a linear spectrum, both the most probable spectrum value and the frequency of the vibrations having the most probable spectrum amplitude can be determined by computing the RMS value of the spectrum amplitudes in the vicinity of each of the frequencies of vibrations having the respective high spectrum amplitudes. Therefore, the determination of the location of the trouble as well as of the cause therefor in the rotating machinery can be carried out in situ.

According to a second preferred embodiment of the present invention, the high spectrum amplitude detector comprises a spectrum comparator for comparing the magnitudes of the frequency band including the frequency of the vibrations having the maximum amplitude to make the frequency, which is an integer multiple of the frequency of the resolving power determined by the frequency spectrum analyzer, coincide with the frequency of the vibration signal indicative of the vibrations generated by the rotating machinery, so that combined spectra spreading over the frequency of an integer multiple of the resolving power of the spectrum analysis can be given in the form of a linear spectrum.

Accordingly, in the second preferred embodiment of the present invention, even when the vibrations of a frequency which is not an integer multiple of the resolving frequency of the frequency spectrum analysis are supplied to the digital frequency spectrum analyzer, the spectrum distribution is processed to a linear spectrum so that an accurate spectrum amplitude of the vibrations of the rotating machinery and the frequency thereof can be directly read from the spectrum amplitude of the linear spectrum and the frequency thereof. Therefore, the determination of the location of the trouble as well as the cause therefor in the rotating machinery can be carried out in situ.

According to a third preferred embodiment of the present invention, arrangement is made to form a differential spectrum by checking the result of spectrum analysis obtained when the rotating machinery being examined was operated under a normal operating condition against the reference frequency spectrum stored in a memory, so that only when the amplitude of the differential spectrum exceeds a predetermined reference value determined by the reference frequency spectrum, a plurality of, for example, ten, high amplitudes are selected out of the differential spectrum and then outputted in the order of the magnitude of the ten amplitudes. Each value of these ten amplitudes is compared with the average value of the amplitude of the differential spectrum which will be obtained during the next succeeding spectrum analysis and the amplitude of the differential spectrum obtained during the previous spectrum analysis, and when each average amplitude is equal to or higher than the amplitude shown during the previous spectrum analysis, some, for example, ten, of differential spectra with respect to the reference frequency spectrum are printed out together with the analyzed values of the frequency spectra as an indication of the trouble represented by the associated frequency.

Accordingly, in the third preferred embodiment of the present invention, in the event that the differential spectrum between the results of spectrum analysis obtained when the rotating machinery being examined was operated under a normal operating condition and the reference frequency spectrum exceed the predetermined reference value, when the average value of the differential spectra in the vicinity of the frequencies giving high differential spectra in these differential spectra is equal to or higher than the average value of the differential spectra obtained during the previous spectrum analysis, each of the frequencies giving the high differential spectra can be recorded on a recording paper together with its spectrum amplitude and, accordingly, the determination of the location of a trouble and the cause therefor can be carried out in situ.

Hereinafter, the embodiments of the present invention will be described with reference to the accompanying drawings.

BRIEF DESCRIPTION OF DRAWINGS

FIG. 1 is a diagram showing the correlation between the type of abnormalities occurring in a rotating machinery and the frequency of vibrations generated thereby;

FIG. 2 is a diagram showing the result of spectrum analysis recorded on a recording paper by a digital printer when the frequency of vibrations of the rotating machinery is 49.5 Hz;

FIG. 3 is a diagram showing the result of spectrum analysis recorded on a recording paper by the digital printer when the frequency of vibrations of the rotating machinery is 50.5 Hz;

FIG. 4 is a block diagram showing a basic circuitry of a diagnosing apparatus according to the present invention;

FIG. 5 is a circuit block diagram showing a first preferred embodiment of the present invention;

FIG. 6 is a diagram showing the root-means-square (RMS) value of ten frequency spectra in the vicinity of each vibration frequency represented by an input signal fed to the apparatus;

FIG. 7 is a circuit block diagram according to a second preferred embodiment of the present invention; and FIG. 8 is a circuit block diagram according to a third preferred embodiment of the present invention.

BEST MODES FOR CARRYING OUT THE INVENTION

The basic construction of the present invention is shown in FIG. 4. In FIG. 4, 1 is a vibration detector of any known electrostatic or piezoelectric type adapted to be mounted on a rotating machinery for generating an electrical vibration signal indicative of the frequency of vibrations of the machinery, 2 is a bandpass filter unit comprised of a combination of high frequency cutoff filter 2a and low frequency cutoff filter 2b, 3 is an analog-to-digital converter for converting the analog signal, which has passed through the bandpass filter unit 2, into a digital signal, and 4 is a digital frequency spectrum analyzer, more specifically, an FFT system, responsive to the digital signal from the converter 3 to perform a frequency spectrum analysis of the vibrations of the rotating machinery. 5 is a spectrum amplitude discriminator for comparing the magnitude of the vibration amplitude for each of the frequencies calculated by the FFT system 4 and for arranging the spectrum amplitudes in the order of the maximum value to the minimum value. 6 is a high spectrum amplitude detector operable to compute the most probable amplitude and the frequency of vibrations having such most probable amplitude by the utilization of amplitude data associated with the high amplitudes selected by the discriminator 5 as will be described later in details, and 7 is a recorder for recording the result of computation performed by the high spectrum amplitude detector 6 on a recording paper.

The cutoff band of the filter unit 2 may be selected depending on the type of rotating machinery to be examined and, therefore, may be replaceable to suit to a particular type of rotating machinery. By way of example, where the rotating machinery generates vibrations which are 50 Hz, the high frequency cutoff bandpass filter 2a is preferred to have a cutoff band within the range of 2 to 5 KHz whereas the low frequency cutoff bandpass filter 2b is preferred to have a cutoff band within the range of 0.1 Hz to 10 Hz.

The high spectrum amplitude detector 6 referred to above may take any one of the constructions which constitute first to third embodiments of the present invention, respectively, these embodiments being hereinafter described separately.

[First Embodiment]

Referring to FIG. 5, 15 is a spectrum amplitude discriminator for discriminating the magnitude of the spectrum amplitudes obtained from the FFT system 4 and for selecting a plurality of, for example, ten, amplitude values in the order from the maximum value to the minimum value, 16 is a root-mean-square computing circuit (RMS circuit) for computing the most probable amplitude value F from the amplitudes of a frequency within the range of $\pm \Delta f$ of the frequency fo giving the maximum amplitude selected by the discriminator (wherein n is a positive integer of 3 or more), which amplitudes are spaced from each other at intervals of the resolving frequency Δf (for example, 1 Hz), 17 is a digital printer operable to print out, as desired, the results of caluculations performed by the discriminator 15 and the RMS circuit 16, and 18 is a control circuit for controlling the various devices described hereinabove.

In this embodiment, the spectrum data analyzed by the FFT system 4 are arithmetically processed in the sequence of the following steps (I) to (V).

(I) At the outset, the magnitude of the spectrum amplitudes obtained from the FFT system 4 is discriminated and, of these spectrum amplitudes discriminated, ten amplitudes including the maximum amplitude are selected. This operation is performed by the discriminator 15.

(II) In the event that the frequency of giving the maximum amplitude is, for example, 50 Hz as shown in FIG. 3 while the resolving frequency Δf is 1 Hz, the most probable amplitude F is computed by the RMS circuit 16 according to the following formula using the amplitudes $A_1$, $A_2$, $A_3$ ... $A_9$ and $A_{10}$ at respective frequencies 45 Hz, 46 Hz, 47 Hz ... 53 Hz and 54 Hz which are spaced at intervals of the resolving frequency Δf=1 Hz.

$$F = \sqrt{\sum_{i=1}^{10} A_i^2} \qquad (1)$$

In this case, according to the result of experiments and the confirmation based on the theoretical calculation, as shown in the table of FIG. 6, even when the frequency of vibrations represented by the vibration signal does not coincide with an integer multiple of the resolving power, the spectrum amplitudes of the vibration frequencies of the rotating machinery being examined can be determined with accuracy of 98% or more only by computing the RMS values of the frequency spectra in the vicinity thereof.

However, it is to be noted that, in FIG. 6, the resolving frequency is assumed to be 1 Hz and a linear spectrum is assumed to be obtained when the output value is 1.00.

By this computation, in the event that the vibration frequency determined by the number of revolution of the rotating machinery being examined does not coincide with an integer multiple of the FFT resolving frequency, the most probable amplitude F of the vibration spectra of such rotating machinery can be obtained.

(III) After the most probable amplitude F of the maximum frequency spectra of the vibrations of the rotating machinery has been computed in the manner as hereinabove described, the frequency of the frequency spectrum having the maximum amplitude is selected by the discriminator 15 from the remaining frequency spectra excluding the ten frequency spectra used during the computation.

(IV) Subsequently, in the same manner as in the step (II), the amplitudes of ten frequency spectra including and adjacent to the selected frequencies are computed according to the formula (I) to give the RMS value.

The amplitude so determined in this manner is in the form of an amplitude of an accurate linear spectrum representative of the second highest frequency spectrum amplitude contained in the frequency spectrum of the vibrations of the rotating machinery being examined.

(V) Further, when the amplitudes of ten frequency spectra excluding the ten frequency spectra used during the computation, i.e., the twenty frequency spectra in total, are processed in the same manner as in the step (II), the third highest amplitude of the frequency spectra can be determined.

The sequence of the above described steps (I) to (V) are carried out by a sequence memory incorporated in the control 18, to ultimately give the amplitudes of the frequency spectra which are useful in the diagnosis of the rotating machinery.

In order to perform the precautionary servicing and maintenance of the rotating machinery effectively, it is important to carry out regular servicing and regular diagnosis to find the tendency of the machinery. In this respect, according to this embodiment of the present invention, even when a slight variation in number of revolution of the rotating machinery result in variation of the distribution of the frequency spectra analyzed, a reliable spectrum amplitude can be obtained and, accordingly, an inspector can perform a real-time diagnosis of the rotating machine in situ according to his simple judgement.

It is to be noted that, during the computation performed at the step (II), in the event that the highest frequency in the frequency spectrum of the vibrations of the rotating machinery coincides with an integer multiple of the resolving power frequency determined by the converter 3 and the FFT system 4, it has already processed in the form of the linear spectrum at the time of computation of the frequency spectra by the FFT system 4 and the amplitude of the neighbouring frequency spectra is zero even though the neighbouring ten frequency spectra including the frequency thereof are square-rooted. Therefore, even in this case, an accurate linear spectrum of amplitudes can be computed.

The above described situation equally applies to the processes performed respectively at the steps (IV) and (V).

[Second Embodiment]

The block circuit diagram according the second embodiment of the present invention is shown in FIG. 7.

Referring to FIG. 7, 25 is a frequency spectrum amplitude discriminator for discriminating the magnitude of the frequency spectrum amplitude on the basis of a distribution of frequency spectra computed by the FFT system 4, 26 is a spectrum comparator for causing the frequency, which is an integer multiple of the resolving power frequency determined by the FFT system 4, to coincide with the frequency of the vibrations detected by the vibration detector 1, 27 is a variable oscillator for varying the interval of the sampling time of the converter 3 in dependence on an output signal from the spectrum comparator 26, 28 is a resolving frequency calculator for calculating a resolving power frequency on the basis of the sampling time interval determined by the oscillator 27, 29 is a control for controlling the above described devices.

In this embodiment, the discriminator 25 is operable to arrange the distribution of the frequencies of vibrations of the rotating machinery in the order from the magnitude of the amplitude thereof and to select the highest frequency spectrum amplitude, thereby designating a set of frequency spectra one on each side of the frequency showing this spectrum.

The two frequency spectra so designated as hereinabove described are compared by the spectrum comparator 26 as to the magnitude of their amplitudes and are processed in the sequence of the following steps (I) to (VI).

(I) At the outset, the highest one of the frequency spectrum amplitudes is compared with the amplitudes of the set of the frequency spectra one on each side of the frequency having such highest amplitude, that is, with the amplitude of the both side band frequency spectra, and in the event that either one of the amplitudes of the both side band frequency spectra is higher than a predetermined ratio (for example, 100:2) as compared with the maximum value of the frequency spectrum amplitudes, the amplitudes of the both side band frequency spectra are compared with each other.

By way of example, referring to FIG. 2, the maximum spectrum amplitude appears at 49 Hz, and, accordingly, the side band frequency is 48 Hz and 50 Hz. Since the ratio of any one of both side band frequency spectrum amplitudes relative to the maximum spectrum amplitude is larger than the predetermined ratio, the magnitude of the spectrum amplitude at 48 Hz and that at 50 Hz are subsequently compared.

(II) If the amplitude of one of the side band frequency spectra which is higher in frequency than that of the other of the side band frequency spectra is found higher than the amplitude of the other of the side band frequency spectra as a result of the comparison, the sampling time interval is prolonged. On the other hand, if the amplitude of one of the side band frequency spectra which is lower in frequency than that of the other of the side band frequency spectra is found higher than the amplitude of the other of the side band frequency spectra as a result of the comparison, the sampling time interval is shortened.

(III) By increasing and decreasing the sampling time interval, the frequency spectra are again calculated and both the frequency $f_1$ of the maximum frequency spectrum amplitude and the amplitudes of side band frequencies $f_1 \pm \Delta f$ are calculated, the relationship of which is compared under the condition previously described in connection with the step (I).

(IV) As a result thereof, the amplitude of each of the spectra of the respective side band frequencies $f_1 \pm \Delta f$ is compared with the amplitude of the frequency $f_1$ and, if it is lower than the predetermined ratio (for example, 100:2), the resolving power frequency calculator 28 calculates the sampling interval, generated from the variable oscillator 27, to determine the resolving power frequency. At this time, the digital printer 17 prints out in a predetermined format both the frequency having the maximum value of the frequency spectrum amplitude and the amplitude.

(V) On the other hand, the amplitude of each of the spectra of the respective side band frequencies $f_1 \pm \Delta f$ is compared with the amplitude of the frequency $f_1$ and, if it is higher than the predetermined ratio the above described operation is again automatically performed by the command fed from the control circuit 29, and the above described frequency spectrum amplitude and frequency are printed out in the predetermined format.

It is to be noted that the control circuit 29 is so designed as to have a function to complete the arithmetic calculation after the previously described computation has been repeated a predetermined number of times, even when the amplitude of each of the spectra of the respective side band frequencies $f_1 \pm \Delta f$ does not become lower than the predetermined ratio when compared with the amplitude of the frequency $f_1$.

(VI) The control circuit 29 has a function to subject the second highest amplitude of the frequency spectrum (usually exhibited by the second and third harmonics of the fundamental frequency of vibrations in the case of the diagnosis of the rotating machinery) to a series of calculation processes described above even after the completion of the series of the above described calculation processes. Therefore, even for the second and third harmonics, their amplitudes and frequencies are printed out by the digital printer 17 in the same manner as hereinbefore described.

By so doing, even if the distribution of the analyzed frequency spectra varies as a result of variation in number of revolution of the rotating machinery being examined, a reliable spectrum amplitude can be determined because the spectrum distribution is transformed into a linear spectrum.

[Third Embodiment]

The block circuit diagram according to the third embodiment of the present invention is shown in FIG. 8.

Referring to FIG. 8, 37 is a reference frequency spectrum storing memory storing the frequency spectrum of the rotating machinery when the latter is operated under a normal operating condition, 38 is a mean value calculator for calculating the mean value of the frequency spectra calculated by the FFT system 4 in such a sequence as the first time, second time and so on (However, in the case of the first time, the input value remains the same.), 39 is a comparator for comparing the amplitude of the frequency spectrum of the vibrations of the rotating machinery, which has been calculated by the FFT system 4 and fed thereto through the mean value calculator 38, with the amplitude of the reference frequency spectrum stored in the memory 37 by matching the frequency spectrum of the vibrations of the rotating machinery and the reference frequency spectrum for each frequency and for generating an output indicative of a differential spectrum when the first mentioned amplitude $A(k_1)$, $A(k_2)$ . . . $A(k_p)$ is higher than the reference amplitude $A_s(k_1)$, $A_s(k_2)$, . . . $A_s(k_p)$ and, at the same time, exceeds a predetermined limit determined in consideration of the reference amplitude, 40 is a sequence discriminator operable to determine the magnitude of the differential spectrum $\Delta A(k_1)$, $\Delta A(k_2)$, $\Delta A(k_3)$ . . . $\Delta A(k_p)$ for each frequency k, which differential spectrum being supplied thereto from the comparator 39, to discriminate a number n of, for example, ten, higher differential signals so that it can generate difference signals in sequence in the order from the highest value, 41 is an abnormality discriminator for discriminating the presence and absence of an abnormality on the basis of both the output from the discriminator 40 and the output from the comparator 39 and for generating an output indicative of the result of discrimination performed thereby, and 42 is a control circuit for controlling the timing of operation of the various circuits following the converter 3.

The comparator 39 serves to calculate the differential amplitude $\Delta A(k_1)$ ($=A(k_1)-A_s(k_1)$), . . . , $\Delta A(k_i)-A_s(k_i)$), . . . $\Delta A(k_p)$ ($=A(k_p)-A_s(k_p)$) between the amplitude $A(k_1)$, . . . , $A(k_i)$, . . . , $A(k_p)$ for each frequency $k_1$, $k_2$, . . . , $K_i$, . . . , $k_p$, calculated by the FFT system 4, and the reference amplitude $A_s(k_1)$—, $A_s(k_i)$,—, $A_s(k_p)$ and to determine whether or not the ratio $\gamma(k_i)$ ($=\Delta A(k_i)/A_s(k_i)$) of the differential amplitude $\Delta A(k_i)$ relative to the reference amplitude $A_s(k_i)$ is larger than a predetermined limit $\alpha(k_i)$. This predetermined limit $\alpha(k_i)$ may be fixed for each frequency $k_i$ to be detected so that the diagnosis can be made for each cause of a trouble or abnormality. Alternatively, the predetermined limit $\alpha(k_i)$ may be fixed equally for all of the frequencies if desired or as the case may be.

This predetermined limit $\alpha(k_i)$ may be determined according to the type of rotating machinery, the accuracy of detection and/or the cause of a trouble or abnormality and may be, for example, within the range of 2 to 10.

The abnormality discriminator 41 perform the following process at the following sequential steps.

(I) The respective amplitudes of a plurality of, for example, ten, differential spectra which have been arranged by the sequence discriminator in the order from the maximum value are printed out together with their associated frequencies.

It is to be noted that the sequence discriminator 40, when at least one amplitude of the differential spectrum exceeding the reference range is present, causes the abnormality discriminator 41 to print out such amplitude value together with the associated frequency.

(II) On the other hand, in the event that the sequence discriminator 40 fails to detect the amplitude of the differential spectrum exceeding the reference range, the abnormality discriminator 41 prints out information that rotating machinery being examined is not out of order and, is operated under a normal operating condition.

(III) In the case of the step (I) described above, the abnormality discriminator 41 generates a command signal to the control circuit 42 thereby designating the frequency corresponding to the amplitude of the differential spectrum which has been printed out so that the next succeeding read-in process can be initiated. In response to this command signal, the FFT system 4 reads in the vibrations of the rotating machinery and performs the spectrum analysis, followed by the calculation of the mean value of the previous amplitude and the currently available amplitude for the same designated frequency, which calculation being performed by the mean value calculator 38. The mean amplitude and the amplitude corresponding to the reference frequency spectrum are compared by the comparator 39, and the differential amplitude found as a result of the comparison is compared by the sequence discriminator 40 with the differential amplitude obtained during the previous comparison. Should the differential amplitude so obtained be equal to or higher than the differential amplitude obtained during the previous comparison, the abnormality discriminator 41 determines that the presence of abnormality in such amplitude is not an accidental occurrence and then prints out to that effect, informing of the presence of the abnormality or trouble.

On the other hand, if the differential amplitude so obtained is lower than that obtained during the previous comparison, the above described calculation to determine the mean value is repeated one or more times and, if the mean value so repeatedly calculated tends to decrease, a mere abrupt change in frequency of the vibrations which is not associated with any abnormality or trouble has accidentally occurred in the rotating machinery during the first detection of the vibrations, the contents of such determination being then printed out.

In the event that the presence of the abnormality in the rotating machinery is indicated by the abnormality discriminator 41 in the manner described above, the calculated differential spectra and the absolute values of the associated frequencies are printed out and, therefore, with the aid of the table shown in FIG. 1, the cause of the abnormality can quickly be located from the frequencies so printed out.

Although the present invention has fully been described in connection with the preferred embodiment thereof with reference to the accompanying drawings, it is to be noted that various changes and modifications obvious to those skilled in the art should be construed as included within the scope of the present invention.

What is claimed is:

1. An apparatus for diagnosing an abnormality which may occur in a rotating machine, which apparatus comprises a vibration detector for detecting vibrations generated by the rotating machinery and generating an electrical vibration signal indicative of the vibrations detected thereby; a bandpass filter unit capable of adjusting its passband in correspondence to the standard vibration of the rotating machinery; an analog-to-digital converter for converting the analog signal which has passed through the filter unit, into a digital signal; a digital frequency spectrum analyzer for calculating a frequency spectrum distribution on the basis of the digital signal supplied thereto; a spectrum amplitude discriminator for selecting high amplitude values out from the frequency spectrum so calculated by the frequency spectrum analyzer; a high spectrum amplitude detector operable for arithmetically processing data of the spectrum amplitude distribution approximating the frequency of the vibrations having the high amplitude values so selected by the spectrum amplitude discriminator to find the maximum possible amplitude of the vibration signal and also the frequency at which the maximum possible amplitude has been attained; and a recorder for recording an output from the high spectrum amplitude detector.

2. An apparatus as claimed in claim 1, wherein said spectrum amplitude discriminator comprises a root-mean-square calculator for calculating the root mean square value from a plurality of spectrum amplitudes of side band frequencies adjacent the frequency giving the maximum amplitude selected by the spectrum amplitude discriminator, at intervals of a frequency represented by the resolving power of the frequency spectrum analyzer.

3. An apparatus as claimed in claim 1, wherein said spectrum amplitude discriminator comprises a spectrum comparator for comparing the magnitudes of side band frequency spectra adjacent the frequency of the maximum amplitude discriminated by the spectrum amplitude discriminator, to make the frequency, which is an integer multiple of the resolving power frequency determined by the frequency spectrum analyzer, to coincide with the frequency of vibrations detected by the vibration detector, while the sampling time interval of the analog-to-digital converter is varied, a variable oscillator for varying the interval of the sampling time of the converter in dependence on an output signal from the spectrum comparator, and a resolving power frequency calculator for calculating a resolving power frequency on the basis of the sampling time interval determined by the oscillator, whereby the frequency spectrum of the vibrations detected by the vibration detector by varying the sampling time interval can be transformed into a linear spectrum to detect both the frequency and spectrum amplitude thereof.

4. An apparatus as claimed in claim 1, wherein said spectrum amplitude discriminator comprises a reference frequency spectrum stored in a memory storing the frequency spectrum of the rotating machinery when the latter is operated under a normal operating condition, a comparator for forming a differential spectrum between the calculated frequency spectrum and the reference frequency spectrum and for sequentially generating an output signal indicative of the amplitude at which the amplitude of the differential spectrum exceeds a predetermined limit determined by the amplitude of the reference frequency spectrum, a sequence discriminator for determining the magnitude of the amplitude in dependence on the differential spectrum fed from the comparator and for generating signals indicative of a number n of high amplitudes in the order from the highest value, wherein n is a positive integer, a mean value calculator operable to perform two or more times a frequency spectrum analysis for each frequency corresponding to the n amplitudes fed from the sequence discriminator only when a significant differential spectrum appears and for calculating the mean value of the frequency spectrum obtained during the previous spectrum analysis and that during the currently performed spectrum analysis, and an abnormality discriminator for comparing the initial amplitude determined during the first discriminator and the mean amplitude determined by the mean value calculator with each other to determine the magnitude thereof and for determining the presence of the abnormality at such frequency when the mean amplitude is higher than the initial amplitude.

5. An apparatus for detecting abnormalities in rotating machinery comprising:
vibration detector means for detecting vibrations caused by the rotating machinery and generating electrical signals indicative of the detected vibrations;
bandpass filter means through which said electrical signals are passed;
analog-to-digital converter means for converting said electrical signals into digital signals;
digital frequency spectrum analyzing means for calculating a frequency spectrum distribution from said digital signals;
discriminator means for selecting high amplitude values from said frequency spectrum distribution;
amplitude detector means for processing spectrum distribution data of frequencies within a range of that of said high amplitude value to select the maximum amplitude and the frequency at which it occurs; and
recorder means for recording an output from said amplitude detector means.

6. The apparatus of claim 5, wherein said discriminator means includes calculator means for calculating a root mean square value from a plurality of spectrum amplitudes at side band frequencies around the frequency at which the maximum amplitude selected by the spectrum amplitude discriminator occurs, at frequency resolving intervals representing the resolving power of the spectrum analyzer means.

7. The apparatus of claim 5, wherein said discriminator means includes:
a spectrum comparator for comparing the magnitudes of side band frequency spectra adjacent the frequency of the maximum amplitude discriminated by said discriminator means, to make that frequency, which is an integer multiple of the resolving frequency, coincide with the frequency of vibrations detected by said vibration detector means, while the sampling time interval of said analog-to-digital converter means is varied;
variable oscillator means for varying the interval of said sampling time in dependence on an output signal from said spectrum comparator; and
frequency calculator means for calculating a resolving power frequency on the basis of said sampling time interval determined by said oscillator means;
whereby the frequency spectrum detected by varying the sampling time interval is transformed into a linear spectrum.

8. The apparatus of claim 5, wherein said amplitude discrimination means includes:
reference memory means for storing the frequency spectrum of the rotating machinery when operating under normal conditions;
comparator means for forming a differential spectrum between the calculated frequency spectrum and the reference spectrum and sequentially generating an output signal indicative of the amplitude by which the amplitude of said differential spectrum exceeds a predetermined limit determined by the amplitude of the reference frequency spectrum;
sequence discriminator means for determining the amplitude in dependence on said differential spectrum and generating signals indicative of n high amplitudes in order from the highest value;
mean value calculator means operable to repeatedly perform a frequency spectrum analysis for each frequency corresponding to each of the n amplitudes when a significant differential spectrum appears, and for calculating the mean value of the frequency spectrum obtained during the previous spectrum analysis and that during the currently performed spectrum analysis; and
an abnormality discriminator for comparing the initial amplitude determined during the first discrimination to the mean amplitude determined by the mean value calculator to determine the magnitude of an abnormality and the presence of the abnormality at such frequency when the mean amplitude is higher than the initial amplitude.

9. The apparatus of claim 5, wherein said bandpass filter means is capable of adjusting its passband in correspondence to the standard vibration of the rotating machinery.

10. The apparatus of claim 5 further comprising:
a spectrum comparator for comparing the magnitudes of side band frequency spectrum adjacent the frequency of the maximum amplitude spectra discriminated by said discriminator means and providing an output signal representative of such comparison;
variable oscillator means for varying the sampling time interval of said analog-to-digital converter means;
control means for controlling said variable oscillator means in dependence upon said output signal and predetermined conditions such that the frequency of the maximum amplitude spectra approaches coincidence with the frequency of vibrations detected by said vibration detector means; and
frequency calculator means for calculating a resolving power frequency from said sampling time interval determined by said oscillator means;
whereby the frequency spectrum detected by varying the sampling time interval is transformed into a linear spectrum.

* * * * *